May 9, 1944.   F. R. McKELVEY   2,348,350
TIRE
Filed Oct. 26, 1940
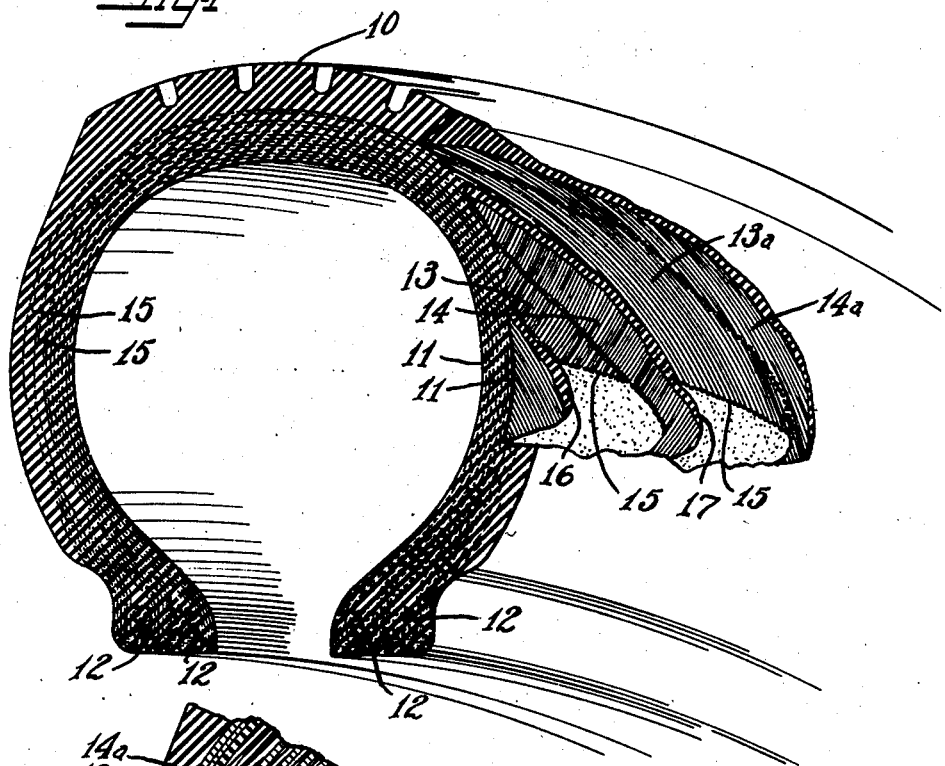
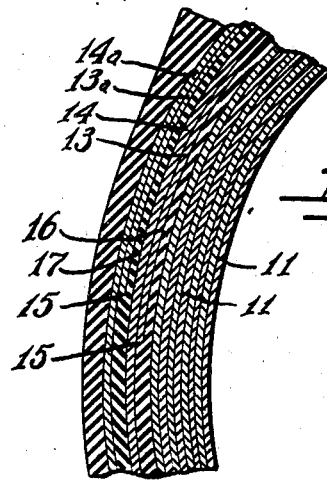
Inventor
Frederick R. McKelvey
By William F. Avery
Att'y Patented May 9, 1944

2,348,350

UNITED STATES PATENT OFFICE 2,348,350

TIRE

Frederick R. McKelvey, Cuyahoga Falls, Ohio, assignor to The B. F. Goodrich Company, New York, N. Y., a corporation of New York Application October 26, 1940, Serial No. 362,938

8 Claims. (Cl. 152—356)

This invention relates to tires and especially to pneumatic tires for motor vehicles of the heavy-duty, commercial type, although features of the invention are useful in pneumatic tires generally.

With the present-day trend toward higher speeds and heavier loads in commercial motor vehicle transportation, it is becoming increasingly desirable that the tires have great strength, resistance to the effects of impact, and heat-resistant properties, especially in the case of heavy-duty truck and bus tires.

In the past, in some tires designed for carrying heavy loads at high speeds, it has been proposed to incorporate a sufficient number of bead to bead reinforcing plies to provide the desired thickness of reinforcing material in the crown and shoulder regions of the tire casing for the purpose of absorbing and distributing the shocks of impact. The number of bead to bead reinforcing plies in this type of prior construction has resulted in excessive tire sidewall thickness. This objectionable sidewall thickness has resulted in increased resistance to flexing in the sidewall, and a consequent increase in the amount of heat generated, thereby weakening the tire at the points of excessive heating.

Heretofore, in attempts to reduce sidewall thickness, the number of plies extending from bead to bead has been reduced and breaker plies have been added at the crown, usually terminating at the shoulder regions of tire casings, and such plies have been superimposed on the outermost bead to bead ply, radially outward thereof. However, it has been found that a decided tendency exists for the margins of breaker plies so disposed to pull away and separate from the rubber material of the tire casing, sometimes resulting in premature failure of the tire. Also, the crossed relation of the cords of adjacent breaker plies ordinarily employed, has sometimes resulted in cord breakage due to the sawing effect of the crossed cords on each other when the crown or shoulders of the tire have struck a sharp obstruction or otherwise have been unduly stressed.

In some cases attempts have been made to reduce the objectionable sawing effect of the crossed cords of the breaker plies by placing thick layers of cushion-rubber between the breaker plies and between the innermost breaker ply and the outermost bead to bead ply to act as insulating means, but an undesirable increase in the thickness of the crown and shoulder regions usually has resulted therefrom. The increased thickness of the crown and shoulder regions of the tire casing has resulted in an objectionable increase in the amount of heat generated in said regions due to increased resistance to flexing. The increased thickness of the tire casing at the crown and shoulders has also resulted in an increase in the magnitude of the tensile stresses in the cords of the inner plies upon impact because of the increase in the distance of the inner plies from the point of impact on the tread of the tire and the consequent objectionable increase in the magnitude of the arc of flexing of the inner plies.

With the constructions comprising breaker plies and cushion rubber fillings therebetween, it has been thought to reduce the crown gauge of the tire, and so better the distribution of stresses resulting from impact, by decreasing the thickness of the tread applied. However, a thinner tread shortens the life of a tire.

The term "breaker" is used herein in accordance with the significance of this term in the tire art, namely a longitudinally extensible ply or strip of less than bead-to-bead width so as to be somewhat yielding under localized shock forces against the tread and, by distributing such forces to lessen their intensity on the bead-to-bead, torque-transmitting plies. However, in prior constructions, so far as I am aware, the breaker plies have been disposed outwardly of the bead-to-bead plies for interception of the shock forces. I have discovered that tires constructed as described hereinafter, in which I dispose breakers within outermost bead-to-bead plies in the manner set forth, give excellent bruise resistance and have other beneficial results as well.

The chief objects of the present invention are to provide breaker plies constructed and arranged in a manner such that the possibility of separation of the margins of said breaker plies from the material of the tire casing is reduced or eliminated; to provide for a minimum thickness of the tire casing at the crown, shoulder regions and sidewalls while providing a strong tire having long life, and one having great thickness of tread cushion; to provide for low operating temperatures; and to provide for economy of materials and convenience of manufacture.

These and further objects will be apparent from the following description, reference being had to the accompanying drawing, in which:

Fig. 1 is a perspective view in section of a tire casing constructed in accordance with and embodying the invention, parts being broken away in steps and sectioned.

Fig. 2 is a fragmentary cross-section of the tire casing on a larger scale, showing details of construction.

An embodiment of the invention is illustrated in the drawing. A tire casing comprising a body of rubber or other rubber-like material includes a tread 10 and has a number of bead to bead reinforcing plies 11, 11 therein anchored about bead cores 12, 12, as shown in Fig. 1.

In accordance with the invention, one or more breaker plies are disposed within outermost bead to bead reinforcing plies. Two breaker plies are incorporated in the construction illustrated. A breaker ply 13 is disposed within the next to the outermost bead to bead reinforcing ply 14 and a breaker ply 13a is disposed within the outermost bead to bead reinforcing ply 14a as shown in Figs. 1 and 2.

The breaker plies may be of any desired width so that their margins may terminate at any point between the crown of the tire casing and the bead portions thereof. For example, the margins may terminate at points 15, 15 in the sidewalls of the tire casing as indicated in Figs. 1 and 2, or the breaker plies may terminate in the shoulder regions, if desired. Breaker ply widths approximately as indicated in Figs. 1 and 2 are preferred because the margins as here shown terminate within the areas of least movement or flexing in the tire casing under operating conditions.

With the breaker plies disposed within outermost bead to bead reinforcing plies, the tendency for the margins of the breaker plies to pull away and separate from the rubber is reduced or eliminated due to the holding action of the bead to bead plies which entirely encircle and firmly cover the breaker plies and the margins thereof.

The breaker plies are preferably of varying widths so that their margins are not aligned, thereby eliminating the possibility of the hinging effect that may result at the points where the margins of the breaker plies terminate in constructions comprising breaker strips with their margins aligned.

Each breaker ply preferably comprises a plurality of cords in substantially parallel relation to each other and positioned so as to extend obliquely around the tire casing. The breaker ply cords may be of cotton, rayon, or other suitable material. In the present embodiment the cords of a breaker ply are desirably disposed in substantially parallel relation to the cords of the reinforcing bead to bead ply within which and adjacent to which said breaker ply is disposed. The parallel cords of the breaker ply and its enclosing bead to bead ply are preferably placed in crossed relation to the cords of the other breaker ply and its bead to bead ply as indicated by the cord arrangement of the plies 13, 13a and 14, 14a shown in Fig. 1 of the drawings and by the cross-hatching of these plies in Fig. 2. Layers 16, 17 of cushion rubber or other suitable material are placed between the pairs of plies, as shown. The cushion rubber 16, 17 provides insulation between the pairs of plies in such a manner that the sawing effect and the restriction of movement between the crossed cords of the adjacent pairs of plies is reduced.

The parallel relation of the unwoven cords of each breaker ply and its enclosing bead to bead ply results advantageously in a tendency of the cords to nest together as in the case with plies shown at 13 and 14, for example, and 13a and 14a, when the tire casing is expanded during the manufacturing process and also in use. A more nearly uniform distribution of stresses throughout the cords of the tire is effected with the parallel cord embodiment, a result of the greater flexibility of the breaker plies and the reduction in the restriction to movement of the cords of the breaker plies and the outermost bead to bead plies, and tangential stripping stresses as a result of torque applied to the tire are more uniformly distributed into the tire casing.

Resistance to flexing of the crown, shoulder and upper sidewall portions of the tire is lessened and objectionable heating in said portions of the tire casing is consequently reduced because of the greater flexibility and consequent reduction in internal friction in the tire casing resulting from the parallel relation of the cords of the paired plies. This is a desirable reduction in heating in the crown, shoulder and upper sidewall portions of the tire casing because the most objectionable heating has usually been found there in constructions in which the cords of breaker ply and bead to bead ply have been in crossed relation, thereby increasing the resistance of the casing to flexing and not allowing for the desirable nesting effect which results with the parallel cord arrangement.

The invention makes possible a reduction over prior constructions in the thickness of the tire reinforcement portion at the crown and shoulders thereof. The necessity is avoided of the expedient of employing thickened cushions of rubber or rubber-like material placed to surround the margins of the breaker plies in an attempt to reduce the tendency toward pulling away or separation of the margins of the breaker plies from the rest of the tire casing, which expedient has often been desirable in prior constructions in which breaker plies were superimposed on the outermost reinforcing bead to bead ply.

The tire reinforcement portion thickness may be further reduced in heavy-duty tires incorporating breaker plies disposed in accordance with the invention inasmuch as it has been found that two or three breaker plies so disposed provide the strength and resistance to the effects of impact that has been provided in prior constructions by four or five breaker plies superimposed on the outermost bead to bead reinforcing ply and each breaker ply having its cords in crossed relation to the cords of the adjacent breaker plies.

Reduced tire reinforcement portion thickness, made possible as hereinabove described, results in a reduction in the temperature in the tire casing under operating conditions, due to the decrease in the resistance to flexing offered by said casing. Improved bruise resistance and better stress distribution under the forces of impact results from the construction herein described. Apparently, this results at least in part from the fact that the magnitude of the arc of flexing of the cords of the inner plies is reduced by a reduction in the total thickness of the tire casing and the resulting reduction in the distance from the point of impact on the tread cushion to the cords of the inner plies.

The reduced thickness of reinforcement has the further advantage that a thicker tread cushion for a given over-all gauge is made possible, thus increasing the life of the tire.

The outer cord plies of a tire are subjected to more severe tangential stripping stresses than are the inner cord plies because of their greater distance from the axis of rotation of the tire under operating conditions. Consequently, the outermost bead to bead reinforcing plies and the breaker plies are preferably constructed with fewer cords per unit width than the inner bead to bead reinforcing plies, and thicker columns of the insulating rubber are therefore provided between the cords incorporated in each outer ply as a result of the wider spacing of such cords to cushion said cords against tangential stripping stresses as a result of torque applied to the tire under operating conditions.

The outermost breaker ply may be of narrower construction than the other breaker plies as shown in Figs. 1 and 2 of the drawing, or the outermost breaker ply may if desired be of wider construction than the other breaker ply or plies.

A pneumatic tire constructed in accordance with the invention provides reduction or elimination of the tendency for the margins of the breaker plies to separate from the body of the tire casing and makes possible a reduction in the thickness of the tire casing which in turn results in reduced tire casing temperature under operating conditions and improved bruise resistance and better stress distribution as a result of impact. Also, the tangential stripping stresses as a result of the torque applied to the tire are more uniformly distributed into the tire casing because of the nesting effect of the parallel cords in the pairs of breaker and reinforcing plies, and the cushion rubber disposed between the pairs of plies. Economy of materials is effected and manufacturing procedure is facilitated.

Variations may be made without departing from the scope of the invention as it is defined by the following claims.

I claim:

1. A tire casing comprising a plurality of bead to bead reinforcing plies and a plurality of breaker plies of laterally extending cords disposed within outermost reinforcing plies in the tread region of the casing, the margins of said breaker plies terminating short of the bead portions of said casing, the breaker plies being within respective reinforcing plies and each of the breaker plies and the reinforcing ply next outward of such breaker ply providing a pair of plies and cushion rubber disposed between the pairs of plies so provided.

2. A tire casing comprising a plurality of bead to bead reinforcing cord plies and a plurality of breaker plies of laterally extending cords disposed within outermost reinforcing plies in the tread region of the casing, the margins of said breaker plies terminating short of the bead portions of said casing, the breaker plies being within respective reinforcing plies and each of the breaker plies and the reinforcing ply next outward of such breaker ply providing a pair of plies with the cords in the plies of each pair all substantially parallel and in crossed relation to the cords of plies of an adjacent pair, and cushion rubber disposed between the pairs of plies so provided.

3. A tire casing comprising a plurality of bead to bead reinforcing cord plies and a plurality of breaker plies of laterally extending cords disposed within outermost reinforcing plies in the tread region of the casing, the margins of said breaker plies terminating short of the bead portions of said casing, the breaker plies being within respective reinforcing plies and each of the breaker plies and the reinforcing ply next outward of such breaker ply providing a pair of plies, with the cords in the plies of each pair being all substantially parallel and in crossed relation to the cords of plies of an adjacent pair, and layers of cushion rubber disposed between pairs of plies and between the innermost pair of plies and the reinforcing ply next inwardly thereof, said breaker plies and the enclosing reinforcing plies having fewer cords per unit width than other of the reinforcing plies inwardly thereof.

4. A tire casing comprising a plurality of bead to bead reinforcing cord plies, a plurality of cord breaker plies of laterally extending cords and of varying widths disposed within the radially consecutive outermost reinforcing plies in the tread region of the casing, the margins of said breaker plies terminating short of the bead portions of said casing and in offset relation, the breaker plies being within respective reinforcing plies and each of the breaker plies and the reinforcing ply next outward of such breaker ply providing a pair of plies, the cords in the plies of each pair being all substantially parallel and in crossed relation to the cords of plies of an adjacent pair, and layers of cushion rubber disposed between pairs of plies so provided and between the innermost of such pairs of plies and the reinforcing ply next inwardly thereof, said breaker plies and their enclosing reinforcing plies having fewer cords per unit width than reinforcing plies inwardly thereof.

5. A tire casing comprising a plurality of bead to bead cord reinforcing plies, and in the tread region of said casing a cord breaker ply disposed within and adjacent to the outermost reinforcing ply, a second cord breaker ply disposed within and adjacent to the next to the outermost reinforcing ply, said breaker plies being of laterally extending cords with the margins of said breaker plies terminating short of the bead portions of said casing and in offset relation, each of the breaker plies and the reinforcing ply next outward of such breaker ply providing a pair of plies, and the cords in the plies of each pair being all substantially parallel and in crossed relation to the cords of the other of such pairs of plies, and the cords of the innermost pair of plies in crossed relation to the cords of the reinforcing ply next inwardly thereof, layers of cushion rubber being disposed between such pairs of plies and between the innermost of such pairs of plies and the reinforcing ply next inwardly thereof, said breaker plies and the enclosing reinforcing plies thereof having fewer cords per unit width than the reinforcing plies inwardly thereof.

6. A tire casing comprising a plurality of bead to bead reinforcing plies and a breaker ply of less than bead to bead width disposed next within an outer reinforcing ply and having its margins enclosed within said outer reinforcing ply, said outer reinforcing ply and said breaker ply comprising laterally extending cords all substantially parallel within the ply, and said cords of the breaker ply being substantially parallel to the cords of said outer reinforcing ply, providing the breaker ply in intimate backing relation to said outer reinforcing ply by the tendency of the cords of the two plies to nest with one another for effective distribution in the tire casing of impact stresses on the tread region thereof.

7. A tire casing comprising a plurality of bead to bead reinforcing plies and a pair of breaker plies of less than bead to bead width each comprising laterally extending cords all substantially parallel within the ply, and the cords of the two breaker plies being crossed with relation to each other, the outer breaker ply being within the outermost bead to bead ply and the cords of said outer breaker ply all being substantially parallel to the cords of said outermost reinforcing ply, providing said outer breaker ply in intimate backing relation to said outermost reinforcing ply by the tendency of the cords of the two plies to nest with one another for effective distribution of the tire casing of impact stresses on the tread region thereof.

8. A tire casing having a body of rubber material and cord reinforcement terminating in bead portions, said casing comprising a plurality of reinforcing plies of laterally extending cords united with said rubber material anchored in said bead portions and extending from bead to bead, and a breaker ply of parallel laterally extending cords also united with said rubber material, said breaker ply extending across the crown of the casing and terminating short of said bead portions with its cords parallel to one of said reinforcing plies and being disposed radially within said reinforcing ply and thereby supported against outward expansion.

FREDERICK R. McKELVEY.